United States Patent
Krausz et al.

(10) Patent No.: US 6,830,268 B2
(45) Date of Patent: Dec. 14, 2004

(54) PIPE REPAIR CLAMP

(75) Inventors: Eliezer Krausz, Tel-Aviv (IL); Avi Chiproot, Kfar-Saba (IL)

(73) Assignee: Krausz Metal Industries Ltd., Tel Aviv (IL)

(*) Notice: Subject to any disclaimer, the term of this patent is extended or adjusted under 35 U.S.C. 154(b) by 0 days.

(21) Appl. No.: 10/716,551

(22) Filed: Nov. 20, 2003

(65) Prior Publication Data

US 2004/0100091 A1 May 27, 2004

(30) Foreign Application Priority Data

Nov. 27, 2002 (IL) .................................. 153136

(51) Int. Cl.$^7$ .............................................. F16L 21/06
(52) U.S. Cl. .......................... 285/15; 285/373; 138/99; 24/279
(58) Field of Search ......................... 285/15, 419, 373, 285/367; 138/99; 24/279

(56) References Cited

U.S. PATENT DOCUMENTS

| | | | | |
|---|---|---|---|---|
| 2,908,061 A | * | 10/1959 | Adams | 24/279 |
| 3,204,665 A | * | 9/1965 | Faint | 138/99 |
| 3,558,162 A | * | 1/1971 | Ferrai et al. | 285/93 |
| 3,680,180 A | * | 8/1972 | Gould et al. | 24/279 |
| 4,056,273 A | * | 11/1977 | Cassel | 285/337 |
| 4,312,526 A | * | 1/1982 | Cassel | 285/419 |
| 4,364,588 A | * | 12/1982 | Thompson | 285/419 |
| 4,365,393 A | * | 12/1982 | Hauffe et al. | 24/279 |
| 4,463,975 A | * | 8/1984 | McCord | 285/419 |
| 4,568,115 A | | 2/1986 | Zimmerly et al. | |
| 4,722,561 A | | 2/1988 | Heckethorn et al. | |
| 4,919,453 A | | 4/1990 | Halling et al. | |
| 5,131,698 A | * | 7/1992 | Calmettes et al. | 285/419 |
| 5,203,594 A | | 4/1993 | Straub et al. | |
| 5,219,001 A | * | 6/1993 | Rennaker | 138/99 |
| 5,271,648 A | | 12/1993 | Krausz et al. | |
| 5,277,458 A | | 1/1994 | Tschann et al. | |
| 5,509,702 A | | 4/1996 | Warehime et al. | |
| 5,645,303 A | | 7/1997 | Warehime et al. | |
| 5,707,089 A | | 1/1998 | Fend et al. | |
| 6,007,106 A | | 12/1999 | Wilkins et al. | |
| 6,062,610 A | * | 5/2000 | Andersson et al. | 285/367 |
| 6,293,556 B1 | | 9/2001 | Krausz et al. | |
| 6,312,025 B1 | | 11/2001 | Wolfsdorf et al. | |
| 6,361,082 B1 | | 3/2002 | Hauki et al. | |
| 6,378,915 B1 | | 4/2002 | Katz et al. | |

FOREIGN PATENT DOCUMENTS

EP          0974780          1/2000

\* cited by examiner

*Primary Examiner*—Eric K. Nicholson
(74) *Attorney, Agent, or Firm*—Eitan, Pearl, Latzer & Cohen Zedek, LLP

(57) ABSTRACT

The present invention relates to a repair clamp providing an improved pipe repair clamp. The clamp according to the invention could be used in some cases as a coupling to join two pipe ends.

The clamp comprises;
a) a metal clamping band to surround 3600 of a pipe. The band being extended at both ends to form a hollow shape including a flat base, a wedge-shaped section and a convex rounded section, elongated apertures being provided to allow passage for screw fasteners through the hollow shape, narrow edges of the wedge-shaped sections being in contact with each other to form a substantially triangularly shaped space between the formed ends; and a flexible inner sealing sleeve disposed inside the clamping band and a pair of profile strips each having a major face for contacting the outer surface of the convex rounded section, and an opposite seating face for shoulder support of a plurality of screw fasteners, the strips having apertures to allow passage of the fasteners, and a plurality of screw fasteners inserted into the apertures wherein the tightening of said screw fasteners reduces the size of the triangularly shaped space and tightens the metal clamping band to compress the flexible inner sleeve sealingly against the outer diameter of the pipes.

5 Claims, 2 Drawing Sheets

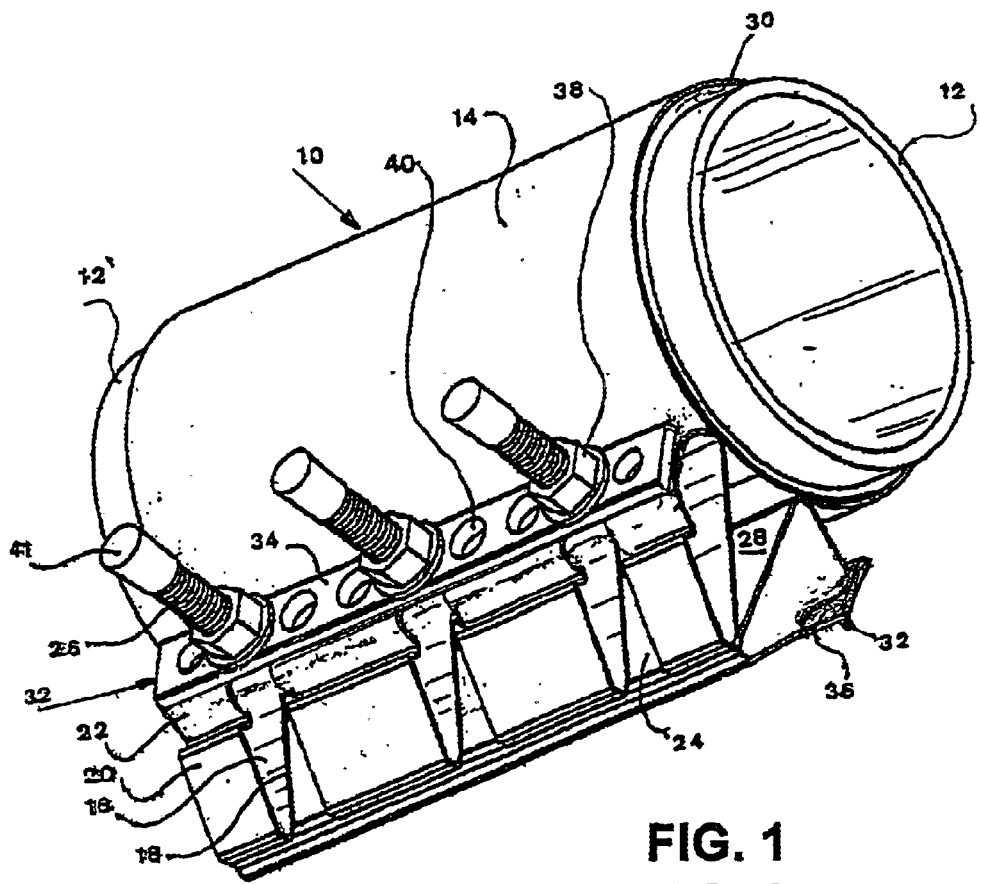
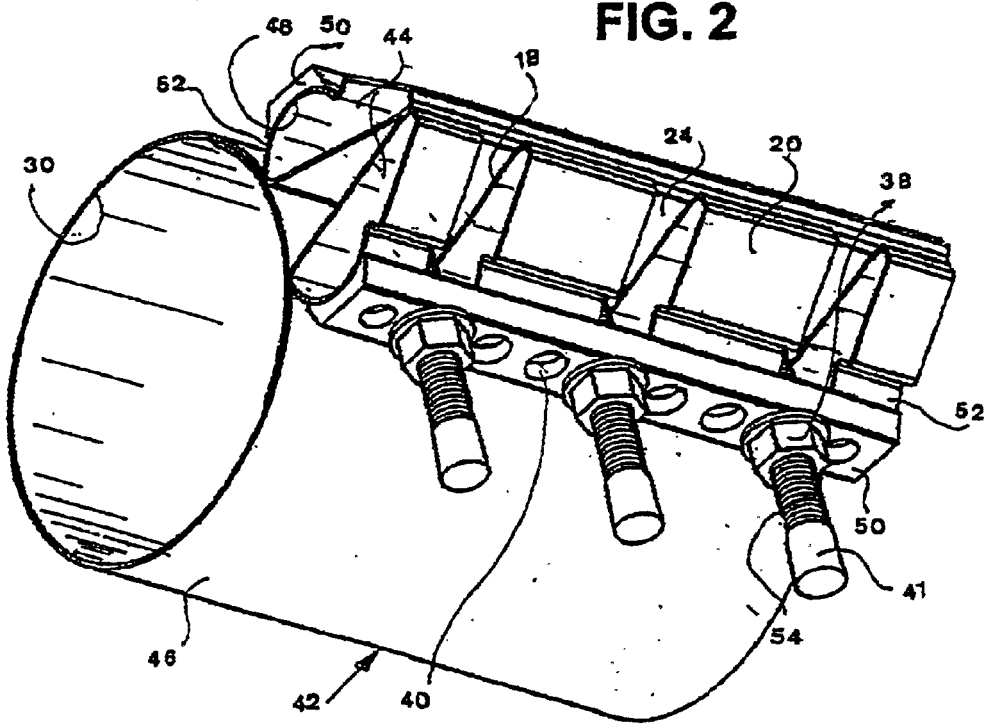
FIG. 1
FIG. 2

PIPE REPAIR CLAMP

CROSS-REFERENCE TO RELATED APPLICATIONS

This application claims priority of IL Patent Application No. 153136, filed Nov. 27, 2002 which is hereby incorporated by reference.

BACKGROUND AND FILED OF THE INVENTION

The present invention relates to a repair clamp.

More particularly, the invention provides an improved pipe repair clamp. The clamp according to the invention could be used in some cases as a coupling to join two pipe ends.

Where extensions, repairs or replacements have to be carried sometimes out under field conditions it is usually much easier to use pipe clamps which do not requiring welding. Furthermore if the work is to be carried out near flammable materials welding will be prohibited, and other methods must be used.

Many prior art pipe couplings are designed to squeeze together a pair of sloping side flanges assumed to be strongly attached or integral with the pipes. Examples of this type of coupling are seen in U.S. Pat. No. 4,568,115 to Zimmerly, U.S. Pat. No. 4,722,561 to Heckethorn et al., U.S. Pat. No. 4,919,453 to Halling et al., U.S. Pat. No. 5,277,458 to Tschann, U.S. Pat. No. 5,509,702 and U.S. Pat. No. 5,645,303 to Warehime et al., and U.S. Pat. No. 5,707,089 to Fend. Pipes and other cylindrical bodies not provided with such flange can not be coupled by devices of this type.

A pipe clamp suitable for use under field conditions is a generally hollow cylindrical body provided with means for gripping and sealing the pipes inserted therein. The diameter range of a clamp or a coupling of a designated size is limited. Such limitation is satisfactory where the outer diameter of the pipeline to be serviced or extended is known in advance. However as field service workers may need to deal with pipes made according to different standards and made of various metals or plastics, prior-art pipe couplings may have limited applications.

While a full review of prior-art pipe couplings or clamps would be volumous, the state of the art can be assessed reasonably well from a review of the above, and additional, more recent US Patents.

Wilkins discloses a complex pipe coupling in U.S. Pat. No. 6,007,106 which includes a plastic seal having high resistance to various chemicals.

The present inventor has disclosed a moderate-cost coupling in U.S. Pat. No. 6,293,556 B1 which is capable of sealing pipes of two different diameters.

Wolfsdorf in U.S. Pat. No. 6,312,025 provides clamping elements to restrain axial separation of the two pipes.

In U.S. Pat. No. 6,361,082 B1 Hauki et al. discloses a pipe coupling intended for connecting plastic tubing of the type used for small diameter low pressure installations. The coupling includes an eccentric tightening arrangement.

A pipe coupling seen in U.S. Pat. No. 6,378,915 B1 to Katz is based on an outer housing, seal members and a nut-like member which is screwed to the outer housing to compress the seal members.

Provision to resist axial separation, and to effect sealing, are included in a coupling device seen in European Patent Application EP 0 974 780 A1 to Hulsebos. The device is however quite complex, and is not intended to cope with large diameter variations.

The present inventor has disclosed a band-type pipe clamp and coupling in U.S. Pat. No. 5,271,648. Clamping was effected by the use of two complementary plates 3 and 4, the band extremities extending slightly beyond the outer edges of said plates.

Anchoring of the band extremities was however found to be limited, and the band was not utilized to provide a support for the screw clamps.

OBJECTS OF THE INVENTION

Bearing in mind this state of the art, it is now one of the objects of the present invention to obviate the disadvantages of prior art pipe couplings and to provide a band-type repair clamp which has a larger diameter range than prior-art and which could also be used as a pipe coupling.

It is a further object of the present invention to provide a wide-range pipe repair clamp provided with improved fastening means.

It is yet a further object of the present invention to provide a wide-range pipe repair clamp at moderate cost by use of a simple tension band to squeeze a flexible high-friction liner against the outer surface of the pipe.

Finally it is an object of the present invention to provide a clamp where the band and the fastener means are integral.

SUMMARY OF THE INVENTION

The present invention achieves the above objects by providing a wide-range pipe repair clamp, comprising:

a) a metal clamping band to surround 3600 of said pipe, said band being extended at both ends to form a hollow shape including a flat base, a wedge-shaped section and a convex rounded section, elongated apertures being provided to allow passage for screw fasteners through said hollow shape, narrow edges of said wedge-shaped sections being in contact with each other to form a substantially triangularly shaped space between said formed ends;

b) a flexible inner sealing sleeve disposed inside said clamping band;

c) a pair of profile strips each having a major face for contacting the outer surface of said convex rounded section, and an opposite seating face for shoulder support of a plurality of screw fasteners, said strips having apertures to allow passage of said fasteners, said profile strips sliding over said convex rounded section when said fasteners are tightened or loosened to maintain said seating face perpendicular to the axes of said fasteners; and d) said plurality of screw fasteners inserted into said apertures wherein the tightening of said screw fasteners reduces the size of said triangularly shaped space and tightens said metal clamping band to compress said flexible inner sleeve sealingly against the outer diameter of said pipes.

In a preferred embodiment of the present invention there is provided a wide-range pipe repair clamp wherein said hollow shape being formed at both ends of said band is filled with a crush-resistant material.

In a most preferred embodiment of the present invention there is provided a wide-range pipe repair clamp wherein the allowed pipe diameter variation is about 50% more than known similar clamps.

Yet further embodiments of the invention will be described hereinafter.

In U.S. Pat. No. 5,203,594 Straub describes and claims a pipe coupling which is split in a longitudinal direction and has inwardly bent end walls and a steel insert sheet of analogous design bridging the housing gap. Possibly the bent walls are intended to prevent extrusion of the flexible sleeve under pressure, but their effect is to sharply reduce diametrical flexibility. Furthermore the tightening method shown has no leverage; tightening the screws by 5 mm will tighten the band by 5 mm.

In contradistinction thereto the present invention uses a plain band without any bent-over lips visible when viewed in a longitudinal cross-section, thus easily achieving the required flexibility. Axial extrusion of the flexible inner sleeve can be prevented without providing end walls—this being the subject of one of our co-pending patent applications.

It will thus be realized that the novel clamp of the present invention serves to provide an economically viable device for repairing of pipes. Larger pipe diameters are accommodated simply by using a longer steel band and larger rubber sleeve, thus the larger the pipe diameter the greater the cost advantage relative to other designs.

Review of the present specification will also make clear that the pipe clamp is not limited for effecting temporary or permanent repair of a damaged pipe but can also be used for joining pipe ends. As a free pipe end is often unavailable in such circumstances the clamp can be dismantled and fitted over the failed section to stop further leakage.

With regard to the pair of profile strips contacting the outer surface of the convex rounded section, these are shown in the drawings with multiple apertures, the strips being as long as the coupling. It will however be understood that discrete short strips or pads could be used.

The drawings show elastomer caps fitted over the screw ends. While not functionally essential, the caps improve the appearance of the coupling, make handling the coupling more pleasant, prevent inadvertent loss of the nut and washer, and protect the screw ends from possible damage.

SHORT DESCRIPTION OF THE INVENTION

The invention will now be described further with reference to the accompanying drawings, which represent by example preferred embodiments of the invention. Structural details are shown only as far as necessary for a fundamental understanding thereof. The described examples, together with the drawings, will make apparent to those skilled in the art how further forms of the invention may be realized.

In the drawings:

FIG. 1 is a perspective view of a preferred embodiment of the clamp according to the invention;

FIG. 2 is a perspective view of an embodiment provided with curved clamp strips;

DETAILED DESCRIPTION OF PREFERRED EMBODIMENT

Figure 3:
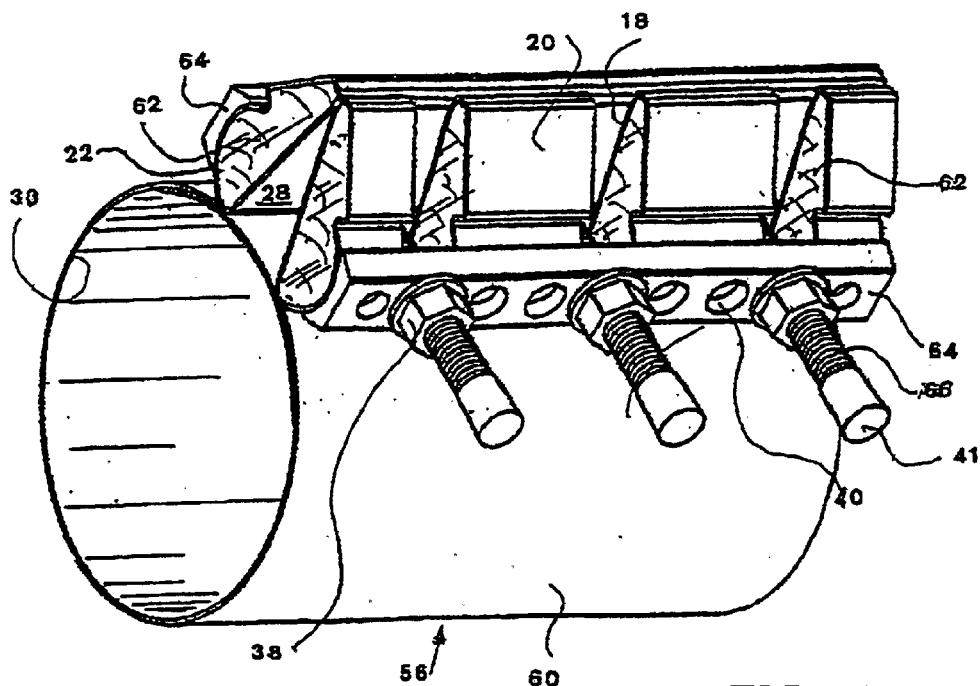
FIG. 3 is a perspective view of an embodiment wherein hollow spaced are filled with a crush resistant material.

There is seen in FIG. 1 a wide-range pipe repair clamp 10 for temporary or permanent repair of pipes or for connecting a pair of pipes 12, 12' in axial sealing relationship.

A metal clamping band 14 surrounds the pipe 12. The band 14 is extended at both ends to form a hollow shape 16 including a flat base 18, a wedge-shaped section 20 and a convex rounded section 22. The hollow shape 16 serves as a lever as seen in the diagrams, and also performs a second function in anchoring the band ends. It is quite clear that the band and the tightening arrangement are integral.

Suitably the band material can be 0.7 mm stainless steel sheet. As the band type coupling requires only a small quantity of material, the durability, corrosion resistance and appearance benefits far outweigh the extra cost of the material.

Elongated apertures 24 are provided 14 to allow passage for screw fasteners 26 through the hollow shape 16.

Figure 4:
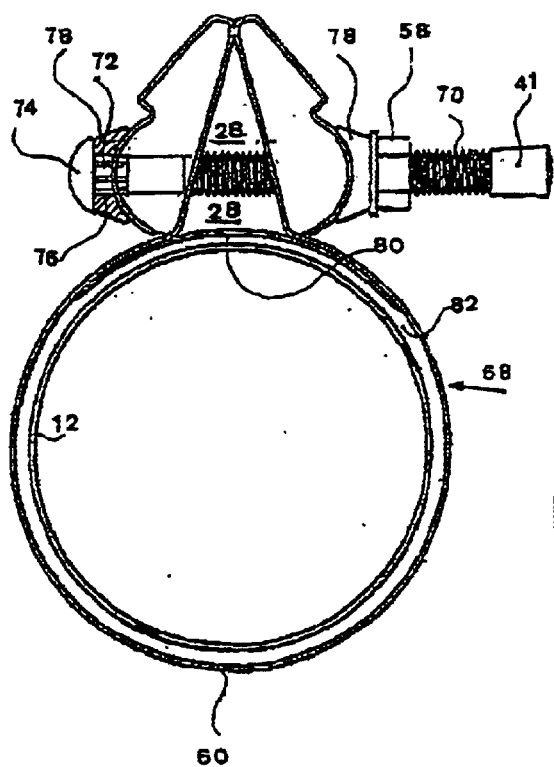
FIG. 4 is a partially sectioned end view of an embodiment wherein the screw fasteners are secured against turning.

The narrow edges of the wedge-shaped sections 20 are in contact with each other to form a substantially triangularly-shaped space 28 between the hollow shapes 16, as seen even more clearly in FIG. 4. The screw fasteners 26 going through the triangularly shaped space 28 thus form a lever which increases the closure movement of the band 14.

A flexible inner sleeve 30, made of a rubber (for example Butyl, Styrene butadiene or neoprene) or a thermoplastic elastomer (for example polyurethane or an olefin) compatible with the fluid to be carried in the pipeline, is disposed inside the clamping band 14 for sealing purposes. The sleeve 30 is preferably configured as a curved overlapping mat which will extend itself to handle any pipe diameter within the range of the coupling. In a co-pending patent application the present inventor describes several embodiments of such sleeves in more detail.

A pair of profile strips 32 each have a major face 34 for contacting the outer surface of the convex rounded section 22, and an opposite seating face 36 for shoulder support of the screw fasteners 26 and nuts 38. Apertures 40 are provided to allow passage of the fasteners 26. The profile strips 32 slide over the convex rounded section 22 when the fasteners 0.26 are tightened or loosened and so maintain the seating face 36 perpendicular to the axes of the fasteners 26.

The three screw fasteners 26 shown in the figure, are inserted into the apertures 40. Tightening of the nuts 38 reduces the size of the triangularly shaped space 28 and tensions the metal clamping band 14. Thus the flexible inner sleeve 30 is compressed to seal against the outer diameter of the pipes 12, 12'.

Elastomer protective caps 41 are optionally fitted over the ends of screw fasteners 26.

Allowed pipe diameter variation is at least 5.6% smaller and larger than nominal size. For example, a pipe coupling whose rated nominal diameter is 142 mm, can be expected to suit any pipe in the range 134–150 mm outside diameter.

With reference to the rest of the figures, similar reference numerals have been used to identify similar parts.

FIG. 2 illustrates an embodiment 42 which is helpful in retaining the desired shape of the hollow shapes 44 formed by the clamp band 46 extension.

The inner major face 48 of the profile strips 50 which contacts the outer surface of the convex rounded section 52 is concave. The radius of curvature matches the radius of curvature of the convex rounded section 52. When the screw fasteners 54 are tightened to close the coupling 42 around a pipe 12 (seen in FIG. 1), the face 48 distributes pressure evenly and so avoids distortion of the hollow shape 44.

Referring now to FIG. 3, there is seen a further embodiment 56 of the wide-range pipe clamp coupling. The hollow shapes formed at both ends of the band 60 are filled with a crush-resistant material 62, such as wood or a closed-cell foamed plastic. The material 62 allows the use of a thinner metal sheet band 60, which could not be used otherwise due to the compressive force applied by the profile strip 64 when the screw fasteners 66 are tightened. The filling material 62 retains the desired shape of the hollow shape whatever the thickness of the metal clamping band 60.

Seen in FIG. 4 is a detail of a wide-range pipe clamp 68. The screw fasteners 70 are provided with a non-circular neck 72, for example having splines, serrations or a hexagonal section, adjacent to the fastener head 74. When the screw fastener is tightened the neck 72 bites into the aperture 76 of the profile strip 78. This prevents the screw fastener 70 from revolving about its own axis while a nut 58 is being tightened.

The figure also shows a curved plate 80 spanning the gap under the triangular space 28, which applies pressure on the flexible inner sleeve 82 where there is no contact with the band clamp 60.

The scope of the described invention is intended to include all embodiments coming within the meaning of the following claims. The foregoing examples illustrate useful forms of the invention, but are not to be considered as limiting its scope, as those skilled in the art will readily be aware that additional variants and modifications of the invention can be formulated without departing from the meaning of the following claims.

We claim:

1. A wide-range pipe repair clamp for temporary or permanent repair of pipes, comprising:
   a) a metal clamping band to surround said pipe, said band being extended at both ends to form a hollow shape including a flat base, a wedge-shaped section and a convex rounded section, elongated apertures being provided to allow passage for screw fasteners through said hollow shape, narrow edges of said wedge-shaped sections being in contact with each other to form a substantially triangularly shaped space between said formed ends;
   b) a flexible inner sealing sleeve disposed inside said clamping band;
   c) a pair of profile strips each having a major face for contacting the outer surface of said convex rounded section, and an opposite seating face for shoulder support of a plurality of screw fasteners, said strips having apertures to allow passage of said fasteners, said profile strips sliding over said convex rounded section when said fasteners are tightened or loosened to maintain said seating face perpendicular to the axes of said fasteners; and
   d) said plurality of screw fasteners inserted into said apertures wherein the tightening of said screw fasteners reduces the size of said triangularly shaped space and tightens said metal clamping band to compress said flexible inner sleeve sealingly against the outer diameter of said pipes.

2. The wide-range pipe clamp as claimed in claim 1, wherein said hollow shape being formed at both ends of said band is filled with a crush-resistant material.

3. The wide-range pipe repair clamp as claimed in claim 1, wherein said major face of said profile strips for contacting the outer surface of said convex rounded section is concave to match the curvature of said convex rounded section.

4. The wide-range pipe repair clamp as claimed in claim 1, wherein said screw fasteners are provided with a non-circular neck adjacent to the fastener head, to deform its aperture in said profile strip and to prevent said screw fastener from revolving about its own axis.

5. The wide-range pipe repair clamp as claimed in claim 1, wherein the band and the tightening arrangement are integral.

* * * * *